United States Patent [19]

Dymond et al.

[11] Patent Number: 4,699,722

[45] Date of Patent: Oct. 13, 1987

[54] AQUEOUS WELL FLUIDS

[75] Inventors: Brian Dymond; David Farrar, both of West Yorkshire, England

[73] Assignee: Allied Colloids Limited, United Kingdom

[21] Appl. No.: 737,818

[22] Filed: May 23, 1985

[30] Foreign Application Priority Data

May 30, 1984 [GB] United Kingdom ................ 8413716

[51] Int. Cl.$^4$ ......................... C09K 7/02; E21B 43/00
[52] U.S. Cl. ............................... 252/8.551; 252/8.514
[58] Field of Search ............ 252/8.5 A, 8.5 C, 8.55 R, 252/8.51, 8.514, 8.551

[56] References Cited

U.S. PATENT DOCUMENTS

| | | | |
|---|---|---|---|
| 3,744,566 | 7/1973 | Szabo et al. | 252/8.55 X |
| 3,909,423 | 9/1975 | Hessert et al. | 252/8.55 X |
| 3,938,594 | 2/1976 | Rhudy et al. | 252/8.55 X |
| 4,046,197 | 9/1977 | Gruesbeck et al. | 252/8.5 X |
| 4,460,758 | 7/1984 | Peiffer et al. | 252/8.55 X |
| 4,490,261 | 12/1984 | Heilweil | 252/8.55 X |
| 4,540,496 | 9/1985 | Peiffer et al. | 252/8.5 |
| 4,554,081 | 11/1985 | Borchardt et al. | 252/8.5 |

Primary Examiner—Herbert B. Guynn
Attorney, Agent, or Firm—Jenner & Block

[57] ABSTRACT

Aqueous well fluids, such as completion, stimulation and work over fluids contain, as a viscosifier, a polymer having recurring units derived from monomers of the formula

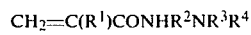

$$CH_2=C(R^1)CONHR^2NR^3R^4$$

wherein $R^1$ is hydrogen or methyl, $R^2$ is straight or branched chain is $C_{2-8}$ alkylene having at least 2 carbon atoms in the backbone and $R^3$ and $R^4$ are independently selected from $C_{1-4}$ alkyl. Preferred units are derived from dimethylaminopropyl methacrylamide, generally as an acid addition salt. The fluids may contain high ion concentrations. The fluids may be used in processes in which they are maintained downhole for long periods of time at high temperatures.

10 Claims, No Drawings

AQUEOUS WELL FLUIDS

There are many instances when a viscosifier is included in an aqueous well fluid for use downhole, in order to increase the viscosity of the fluid.

One problem with downhole fluids is that they may encounter high temperatures and many viscosifiers become less effective with increasing temperature. If this is due to permanent degradation the fluid may be unacceptable. If the reduction in viscosity is due to thermal thinning the fluid will need a high viscosity at the well head in order to compensate for the thinning, and often it is not practicable to achieve sufficient compensation in this manner.

A particular problem arises in well fluids having a high ion concentration, for instance, those that are weighted by dissolved brine, because the ion concentration precipitates many of the organic polymers that might otherwise be suitable for use as viscosifiers. Some polymers are not precipitated and so can be used (examples being hydroxyethyl cellulose and Xanthan gum) but they degrade when maintained at high well temperatures.

An aqueous well fluid according to the invention for use downhole contains, as a viscosifier, a polymer having recurring units derived from monomers of the formula $$CH_2=C(R^1)CONHR^2NR^3R^4$$

wherein $R^1$ is hydrogen or methyl, $R^2$ is straight or branched chain $C_{2-8}$ alkylene having at least 2 carbon atoms in the backbone and $R^3$ and $R^4$ are independently selected from $C_{1-4}$ alkyl. $R^1$ is preferably methyl and $R^2$ may be for instance ethylene, isopropylene, t-butylene or 2-ethyl-1,6-hexylene, but is preferably 1,3-propylene. $R^3$ and $R^4$ are usually independently selected from methyl and ethyl. The preferred recurring unit is derived from dimethylaminopropyl methacrylamide (DMAPMA).

The specified recurring units may be in the form of a partial or complete acid salt or a partial or complete quaternary ammonium salt, that is to say some or all of the recurring units may be in the form of an acid salt or quaternary ammonium salt. Suitable acid salts are formed with organic or inorganic acids, especially sulphuric or hydrochloric acid. Suitable quaternising groups are $C_{1-4}$-alkyl or-hydroxyalkyl, such as methyl, ethyl, propyl or 2-hydroxy ethyl, preferably methyl or ethyl. Suitable counterions are chloride, sulphate, methyl sulphate, acetate and nitrate. The recurring unit may for instance be quaternised with ethylene oxide or epichlorhydrin in an acid, to give the N-(2-hydroxyethyl) derivative. Preferred quaternising compounds are methyl chloride and dimethyl sulphate. The acid salts (generally with sulphuric acid) are usually preferred.

The polymer preferably is a homopolymer of the specified unit but it may be a copolymer with other copolymerisable ethylenically unsaturated monomers, generally other acrylic monomers, provided these other monomers do not significantly detract from the required properties of the polymer, as discussed below. Generally the polymer contains at least 50% molar, preferably at least 80% and most preferably at least 90% molar DMAPMA or other specified unit. Suitable comonomers that may be used include (meth)acrylamide, N-vinyl N-methyl acetamide, vinyl pyrollidone, (meth)acrylic acid, diallyl dimethyl ammonium chloride, and acid or quaternary salts of dialkyl aminoalkyl(-meth)acrylates. Generally the comonomer is non-ionic and is usually acrylamide.

The polymer is generally a linear polymer that is soluble in water and aqueous solutions and will have a molecular weight high enough to impart the desired viscosifying characteristics. Generally the molecular weight is above 1 million.

The amount of the polymer is generally 0.1 to 5%, preferably 0.25 to 2% by weight of the fluid.

The well fluids of the invention have the advantage that their viscosity is not as temperature dependent as many known well fluids and so they can be used over a wider range of well temperatures whilst avoiding the necessity for excessive viscosities at the well surface. They are particularly effective where the well temperature is above 120° C.

The well fluids can have relatively low ionic concentrations, for instance they can be drilling fluids formed from fresh or sea water (NaCl concentration about 3.3%), viscosifier and suspended weighting aid, such as barytes. The specified polymer can be the main or only viscosifier or it can be a secondary viscosifier, for instance being used in combination with a Xanthan gum or bentonite.

The aqueous well fluids of the invention are of particular value when they are maintained downhole at above 120° C., often above 130° C. and frequently above 160° C., for prolonged periods, often at least 1 hour and frequently 8 to 72 hours or more. They are of particular value when the well fluids have a high ionic concentration, generally as a result of having dissolved therein, as weighting agent, metal chloride and/or bromide. Particularly preferred aqueous fluids of the invention have calcium bromide in solution but other useful fluids contain calcium chloride, calcium bromide, zinc bromide or, in some instances, sodium chloride. The amount of metal chloride or bromide in solution as weighting agent is generally at least 10% by weight, often at least 30% and can be up to 70% by weight, often being in the range 45 to 60% by weight. Often the solution is saturated with the chloride or bromide salt.

These well fluids are of value for various downhole purposes for engineering purposes for construction or maintenance of the well (in contrast to recovery purposes for forcing hydrocarbon from a reservoir, e.g., pusher fluids). Typically the fluids are used as completion fluids, stimulation fluids or workover fluids, including for instance perforation fluids, gravel pack fluids, fracturing fluids, non-damaging drilling fluids to the producing zone and viscosified pill fluids to block thief zones. Preferably the fluids are completion fluids such as gravel-pack and perforation fluids. For instance they can be used to inhibit strata dissolution, to stabilise a bore hole or cuttings that are water sensitive. They also give reduced fluid loss and reduced friction.

The high ion content well fluids may also contain suspended solids, preferably suspensions of solids that can easily be removed without damage to the permeability of the producing formation, for instance suspensions of oil soluble or acid soluble solids such as calcium carbonate or iron carbonate. The suspended solids are present for the purpose of increasing density and for filter cake formation at the walls of the bore to reduce filtrate loss. When suspended solids are present in the fluid, the viscosifier improves suspension of the solids in the fluid and the resultant composition is generally shear thinning. Thus under high shear the composition has relatively low viscosity, thereby facilitating its placement in the bore, but under low shear it gives high viscosity, good suspending properties and good filtrate loss resistance.

The fluids according to the invention may also be used in processes in which the viscosity of the fluid is increased after it has been introduced into the well by partially cross-linking the polymer. The polymer for use in such processes should contain anionic units derived from a comonomer such as acrylic acid, usually in amounts up to 10 or 15 mole percent of the total units. Cross-linking is achieved by contacting the polymer with a polyvalent metal ion, such as $Ti^{4+}$, $Cr^{3+}$ or $Al^{3+}$ into the well, either by introducing the metal ion in solution after the fluid has been introduced or by introducing the ion in a slow release composition in the fluid itself. Increasing the viscosity of the fluid in this manner prolongs its residence time downhole.

The polymers used in the invention are preferably incorporated into the well fluid in liquid form, either as a polymer solution or as a dispersion of polymer particles in oil, often in the presence of an oil-in-water emulsifier. The solution can be made by solution polymerisation of the monomers, or by dispersing a polymer in oil dispersion in water or by dissolving solid polymer in water. The polymer is preferably made by reverse phase polymerisation, that is to say polymerisation of a dispersion in oil of aqueous monomer, often followed by azeotropic distillation of the water. If desired solid polymer can be separated from the dispersion or from a solution in which it is polymerised.

A typical reverse phase polymerisation process for making the half-sulphate salt of DMAPMA homopolymer is as follows:

| Aqueous phase components | |
|---|---|
| Dimethylamino propyl methacrylamide | 82.5 pts |
| Water | 82.5 pts |
| Sulphuric acid (50%) | 23.2 pts |
| Non-aqueous phase | |
| Mineral Oil | 66 pts |
| Low boiling point mineral solvent | 34.8 pts |
| Emulsion stabiliser | 24.4 pts |
| Emulsifier | 2.7 pts |
| AZDN | 0.008 pts |

The aqueous phase components are mixed and the pH adjusted to 6.0 with the sulphuric acid. The separately combined non-aqueous phase is then added and a stable emulsion formed by high shear mixing. During this time the mixture is de-oxygenated by nitrogen sparging. 10 ppm tertiary butyl hydroperoxide and 18 ppm sodium meta bisulphite (both calculated on aqueous phase) are then added as initiators to commence polymerisation. After polymerisation has been completed the water and low boiling mineral solvent are removed by azeotropic distillation to give a dispersion of 50% polymer in oil.

In each of the following examples this dispersion was mixed into an aqueous well fluid having the other components specified.

EXAMPLE 1

To determine the viscosity of a high ion content well fluid maintained at high temperatures for prolonged periods, the viscosity was observed of 52% calcium bromide solution aged at 160° C. for 16 hours with varying amounts of the polymer. The polymer concentration is recorded in Table 1 as percent w/v and the viscosity is recorded in cP at 160 $sec^{-1}$ shear rate.

TABLE 1

| Polymer Concentration | Viscosity |
|---|---|
| 0 | 9 |
| 0.25 | 15 |
| 0.5 | 30 |
| 1.0 | 66 |
| 1.5 | 99 |
| 2.0 | 174 |

With a 55% solution of a 1:1 calcium bromide:zinc bromide mixture, the viscosity at 160 $sec^{-1}$ shear rate increased from 15 cP at 160° C. for 16 hours in the absence of polymer to 180 cP in the presence of 1% polymer.

As a comparison to the values in Table 1, various amounts of other polymers were added at 0.85% w/v concentration and were aged at various temperatures and their viscosity was then recorded, as shown in Table 2.

TABLE 2

| Additive | Aging Temp. (°C.) | Viscosity at 160 $sec^{-1}$ at 25° C. (cP) |
|---|---|---|
| — | — | 9 |
| HEC | 80 | 462 |
| " | 120 | 54 |
| " | 160 | 9 |
| Xanthan gum | 80 | 117 |
| " | 120 | 12 |
| " | 160 | 9 |

The values shown in Table 2, especially compared to those shown in Table 1, clearly demonstrate the superiority of the DMAPMA polymer.

EXAMPLE 2

Low pressure filtrate loss measurements were made in accordance with API RP 13B standard methods to determine the fluid loss of 52% calcium bromide brine (15 ppg) free of the polymer and the corresponding brine containing polymer. The brine free of polymer underwent a total filtrate loss in 65 seconds. The brine containing 1% w/v polymer underwent a 30 minute filtrate loss of only 50 ml.

EXAMPLE 3

A 550 ppb suspension of calcium carbonate in calcium bromide brine (52%) has a viscosity of 723 cp and a filtrate loss showing total volume loss at 20 seconds. The suspension is unstable with respect to sedimentation in a short period of time.

A corresponding suspension with the presence of 0.5% of the additive on brine volume gives a desirably reduced viscosity of 252 cP with a 30 minute filtrate loss of only 28 mls. The suspension is stable to sedimentation for extended periods of time. The rheological characteristics are improved with the additive's presence in that the fluid becomes more suitably shear thinning. This is an improved condition for use, i.e. exhibiting low viscosity to improve ease of placement under high shear conditions, but giving suspending properties and filtrate loss resistance by high viscosity under low shear conditions. This is shown by Table 3 which shows the effect of the polymer on the viscosity (cP) at two shear rates.

TABLE 3

| | 5 sec$^{-1}$ shear rate | 170 sec$^{-1}$ shear rate |
|---|---|---|
| No additive | 900 | 723 |
| Additive at 0.5% | 2900 | 252 |

The above benefits are maintained even after aging at 160° C. for 16 hours.

What is claimed is:

1. A method of completing or working over a hydrocarbon well in which an aqueous completion or workover well fluid comprising a viscosifier is introduced into the well and is maintained downhole at a temperature above 120° C. for more than one hour and in which the fluid also comprises at least 10% by weight metal halide selected from the group consisting of metal bromides and metal chlorides as a weighting agent and the viscosifier is a homopolymer having molecular weight of at least 1 million and formed of ethylenically unsaturated monomer units derived from monomers of the formula $$CH_2=C(R^1)CONHR^2NR^3R^4$$

wherein $R^1$ is hydrogen or methyl, $R^2$ is selected from straight and branched chain $C_{2-8}$ alkylene groups having at least 2 carbon atoms in the backbone and $R^3$ and $R^4$ are independently selected from $C_{1-4}$ alkyl or acid salts or quaternary ammonium salts of said monomers.

2. A method according to claim 1 in which $R^1$ is methyl, $R^2$ is 1,3-propylene and $R^3$ and $R^4$ are each methyl.

3. A method according to claim 1 in which some at least of the units are in the form of an acid addition salt.

4. A method according to claim 1 in which the fluid comprises 0.1 to 5% by weight of polymer.

5. A method according to claim 1 in which the weighting agent is substantially saturated in the fluid.

6. A method according to claim 1 in which the metal halide is selected from calcium chloride, calcium bromide, zinc bromide and sodium chloride.

7. A method according to claim 1 in which the fluid is maintained downhole for at least eight hours.

8. A method according to claim 1 in which the fluid is maintained downhole at a temperature above 160° C.

9. A method according to claim 1 in which the polymer is a homopolymer of a monomer of the formula $CH_2=C(R^1)CONHR^2NR^3R^4$ wherein $R^1$ is hydrogen or methyl, $R^2$ is 1,3-propylene and $R^3$ and $R^4$ are each methyl.

10. A method of completing or working over a hydrocarbon well in which an aqueous completion or workover well fluid comprising a viscosifier is introduced into the well and is maintained downhole at a temperature above 160° C. for at least eight hours and in which the fluid also comprises at least 10% by weight metal halide selected from the group consisting of metal bromides and metal chlorides as a weighting agent and the viscosifier is a homopolymer having molecular weight of at least 1 million and formed of ethylenically unsaturated monomer units derived from monomers of the formula $$CH_2=C(R^1)CONHR^2NR^3R^4$$

wherein $R^1$ is methyl, $R^2$ is 1,3-propylene and $R^3$ and $R^4$ are independently selected from $C_{1-4}$ alkyl, wherein at least some of the units are in the form of an acid addition salt and the fluid comprises 0.1% to 5% of homopolymer by weight.

* * * * *